(12) United States Patent
Gallino

(10) Patent No.: US 7,346,509 B2
(45) Date of Patent: Mar. 18, 2008

(54) SOFTWARE FOR STATISTICAL ANALYSIS OF SPEECH

(75) Inventor: Jeffrey A. Gallino, Cape Coral, FL (US)

(73) Assignee: Callminer, Inc., Fort Myers, FL (US)

( * ) Notice: Subject to any disclaimer, the term of this patent is extended or adjusted under 35 U.S.C. 154(b) by 691 days.

(21) Appl. No.: 10/672,767

(22) Filed: Sep. 26, 2003

(65) Prior Publication Data

US 2004/0064316 A1   Apr. 1, 2004

Related U.S. Application Data

(60) Provisional application No. 60/414,286, filed on Sep. 27, 2002.

(51) Int. Cl.
  *G10L 15/00* (2006.01)
(52) U.S. Cl. ................................ 704/251; 704/240
(58) Field of Classification Search .................. None
  See application file for complete search history.

(56) References Cited

U.S. PATENT DOCUMENTS

| | | | |
|---|---|---|---|
| 5,170,432 A | 12/1992 | Hackbarth et al. | |
| 5,828,991 A * | 10/1998 | Skiena et al. ................... | 704/9 |
| 5,956,681 A | 9/1999 | Yamakita | |
| 6,363,346 B1 | 3/2002 | Walters | |
| 6,366,882 B1 * | 4/2002 | Bijl et al. .................... | 704/235 |
| 6,823,307 B1 * | 11/2004 | Steinbiss et al. ............ | 704/252 |
| 6,970,818 B2 * | 11/2005 | Menedez-Pidal et al. ... | 704/236 |
| 7,054,812 B2 * | 5/2006 | Charlesworth et al. ..... | 704/251 |
| 2002/0052742 A1 | 5/2002 | Thrasher et al. | |
| 2002/0072896 A1 | 6/2002 | Roberge et al. | |
| 2002/0133341 A1 | 9/2002 | Gillick et al. | |
| 2002/0184019 A1 | 12/2002 | Hartley et al. | |

FOREIGN PATENT DOCUMENTS

WO   WO 01/74042   10/2001

OTHER PUBLICATIONS

Written Opinion for International Application No. PCT/US03/30614 mailed Mar. 15, 2006.

Amy Neustein, Ph.D., "A New Natural Language Method for Performing Efficient Mining of Government Tape-Recordings of the Conversations of Terror Suspects," Linguistic Technology Systems.

(Continued)

*Primary Examiner*—Abul K. Azad
(74) *Attorney, Agent, or Firm*—Wolf, Greenfield & Sacks, P.C.

(57) ABSTRACT

Computer-implemented methods and apparatus are provided to facilitate the recognition of the content of a body of speech data. In one embodiment, a method for analyzing verbal communication is provided, comprising acts of producing an electronic recording of a plurality of spoken words; processing the electronic recording to identify a plurality of word alternatives for each of the spoken words, each of the plurality of word alternatives being identified by comparing a portion of the electronic recording with a lexicon, and each of the plurality of word alternatives being assigned a probability of correctly identifying a spoken word; loading the word alternatives and the probabilities to a database for subsequent analysis; and examining the word alternatives and the probabilities to determine at least one characteristic of the plurality of spoken words.

14 Claims, 8 Drawing Sheets

OTHER PUBLICATIONS

Amy Neustein, Ph.D., "Using sequence Package analysis to Improve Natural Language Understanding," International Journal of Speech Technology, 4, pp. 31-44, 2001.

Amy Neustein, Ph.D., "Sequence Package Analysis: A New Natural Language Understanding Method for Performing Data Mining of Help-Line Calls and Doctor-Patient Interviews," Natural Language Understanding and Cognitive Science Workshop, Apr. 13, 2004.

Amy Neustein, Ph.D., "Sequence Package Analysis: A New Global Standard for Processing Natural Language Input?" The LISA Newsletter, vol. X111, 1.2 ISSN 1420-3693, Feb. 18, 2004, pp. 1-2, http://www.lisa.org/archive_domain/newsletters/2004/1.2/neustein.html.

Amy Neustain, Ph.D., "Smart" Call Centers: Building Natural Language Intelligence into Voice-Based Applications, Smart Technology Magazine, pp. 1-5, Jul./Aug. 2002, http://www.speechtechmag.com/issues/7_4/cover/915-1.html.

Garofolo, et al: "*The TREC Spoken Document Retrieval Track: A Success Story*" RIAO 2000 Paris: Recherche D'Information Assistee Par Ordinateur, [online] Apr. 12, 2000.

Rose, et al: "Techniques for Information Retrieval From Voice Messages" Speech Processing 2, VLSI, Underwater Signal Processing. Toronto, May 14-17, 1991, Int'l Conference on Acoustics, Speech & Signal Processing. ICASSP, New York, IEEE, US, vol. 2 Conf. 16, Apr. 14, 1991, pp. 317-320.

* cited by examiner

FIG. 8

Microsoft Office Excel 2003 Beta - Call Mix-June03.xls

Continental Airlines
International Call Mix Survey
Jun-03

| | | NHC | | SLC | | TPA | | System Total | |
|---|---|---|---|---|---|---|---|---|---|
| SALES CALLS | | | | | | | | | |
| POTENTIAL SALE | | | | | | | | | |
| Sale Made | | 0 | NA | 75 | 49.02% | 29 | 42.65% | 104 | 47.00% |
| Sale Not Made | | 0 | NA | 78 | 50.98% | 39 | 57.35% | 117 | 52.84% |
| | Sales Subtotal | 0 | | 58 | | | | 2.21 | |
| TICKETING | | | | | | | | | |
| E-TKT Accepted | | 0 | NA | 19 | 25.33% | 3 | 10.34% | 22 | 21.15% |
| E-TKT Declined | | 0 | NA | 42 | 50.00% | 5 | 17.24% | 47 | 45.38% |
| E-TKT Not Offered | | 0 | NA | 0 | 8.00% | 3 | 10.34% | 9 | 3.65% |
| | | 0 | | 57 | | 11 | | 78 | |
| E-TKT Not Applicable | | 0 | NA | 5 | 0.07% | 1 | 3.45% | 6 | 5.77% |
| TBM/TBE Offered | | 0 | NA | 0 | NA | 0 | NA | 0 | NA |
| SALES PERFORMANCE | | | | | | | | | |
| % of Sales Opportunities | | | NA | | 23.79% | | 38.58% | | 21.17% |
| % of Booking vs. Opportunities | | | NA | | 49.02% | | 42.63% | | 47.00% |
| % of Bookings vs. TTL Sample | | | NA | | 11.55% | | 7.23% | | 3.95% |
| REWARD RESERVATIONS | | | | | | | | | |
| REWARD BOOKING | | | | | | | | | |
| Sale Made | | 0 | NA | 35 | 72.92% | 10 | 55.53% | 45 | 65.15% |
| Sale Not Made | | 0 | NA | 13 | 27.06% | 8 | 44.44% | 21 | 31.32% |
| | Reward Subtotal | 0 | | | | | | 68 | |
| REWARD TICKETING | | | | | | | | | |
| E-TKT Accepted | | 0 | NA | 10 | 22.67% | 0 | NA | 10 | 22.22% |
| E-TKT Declined | | 0 | NA | 21 | 60.00% | 3 | 10.00% | 34 | 53.33% |
| E-TKT Not Offered | | 0 | NA | 1 | 2.39% | 0 | NA | 1 | 2.22% |
| | | 0 | | 32 | | 3 | | 35 | |
| E-TKT Not Applicable | | 0 | NA | 1 | 2.59% | 4 | 40.00% | 5 | 11.11% |
| TBM/TBE Offered | | 0 | NA | 1 | 2.69% | 1 | 10.00% | 2 | 4.44% |
| REWARD SALES PERFORMANCE | | | | | | | | | |
| % of Reward Opportunities | | | NA | | 7.47% | | 4.48% | | 0.32% |
| INFORMATION CALLS | | | | | | | | | |
| Fifo | | 0 | NA | 22 | 3.42% | 20 | 4.59% | 42 | 4.02% |
| Modification Cancellation | | 0 | NA | 119 | 18.51% | 69 | 17.21% | 185 | 18.01% |
| Reconfirmation | | 0 | NA | 64 | 9.58% | 68 | 14.45% | 122 | 11.09% |
| Seat Assignment | | 0 | NA | 18 | 2.43% | 18 | 3.99% | 32 | 3.07% |
| Ticketing | | 0 | NA | 42 | 5.53% | 23 | 8.66% | 70 | 6.70% |
| OnePass Other | | 0 | NA | 23 | 3.89% | 18 | 4.49% | 43 | 4.12% |
| Upgrades | | 0 | NA | 41 | 6.38% | 18 | 4.43% | 59 | 5.55% |
| Receipt Request | | 0 | NA | 24 | 3.75% | 12 | 2.99% | 36 | 3.45% |
| Travel Agency | | 0 | NA | 19 | 2.85% | 7 | 1.78% | 25 | 1.43% |
| Policy and Procedures | | 0 | NA | 35 | 5.81% | 24 | 5.89% | 62 | 5.24% |
| Other | | 0 | NA | 32 | 4.98% | 45 | 11.22% | 77 | 7.38% |
| | Info Subtotal | 0 | NA | 442 | 68.74% | 315 | 13.44% | 757 | 72.53% |
| TOTAL CALLS MONT ORED | Total | 0 | | 640 | | 401 | | 1044 | |

805 — POTENTIAL SALE
810 — TICKETING

SOFTWARE FOR STATISTICAL ANALYSIS OF SPEECH

REFERENCE TO RELATED APPLICATION

This application claims the benefit of U.S. Provisional Application Ser. No. 60/414,286, filed Sep. 27, 2002, entitled "Software for Statistical Analysis of Speech," which is incorporated herein by reference.

FIELD OF THE INVENTION

This invention relates to computer software, and more particularly to computer software to facilitate recognition of the content of voice data.

BACKGROUND

Speech recognition is a field in which significant research and development has taken place. The U.S. Department of Defense began sponsoring studies in the late 1940's, and commercially led advances, by companies such as Bell Laboratories and IBM, followed shortly thereafter. Today, speech recognition tools exist for a wide range of applications, including assistance for the deaf, voice commands for electronic devices such as computers, and for identifying words which comprise voice-based commercial interactions (such as in customer support or telemarketing settings).

Conventional speech recognition techniques function by identifying a single "best" match for a spoken word or phrase. A conventional speech recognition tool receives a spoken word or phrase, converts it to an electronic format, matches its component sounds to a collection of reference data (a "lexicon," which may include up to tens of thousands of words that the tool has been configured to recognize), identifies a collection of possible matches ("alternatives") for the spoken word or phrase, and assigns each alternative a probability that it represents the actual word or phrase which was spoken. Any of numerous techniques may be used to identify alternatives for the spoken word or phrase, and/or assign each of the alternatives a corresponding probability of being correct. One prevalent technique is the mathematical modeling method known as the Hidden Markov Model (HMM). Briefly, HMM builds a decision tree with nodes for each of the alternatives it identifies, and based on the characteristics of the combination of words at each node, determines the probability of correctness of each node in relation to the other nodes. Once HMM assigns a probability to each alternative, conventional speech recognition tools select the alternative which has been assigned the highest probability as the correct alternative.

Speech recognition efforts are plagued by significant technical obstacles, brought on by the highly variable nature of speech patterns. In particular, the identification of alternatives and corresponding probabilities for spoken words or phrases is complicated by varying adherence to grammatical correctness, context, accents, and countless other linguistic variables. These challenges have made the precise recognition of a word or phrase, from among tens of thousands of possibilities, a very difficult endeavor for decades. Indeed, speech recognition remains extremely problematic and prone to error.

SUMMARY OF THE INVENTION

In accordance with one embodiment, a method is provided for analyzing verbal communication. The method comprises acts of: (A) producing an electronic recording of a plurality of spoken words; (B) processing the electronic recording to identify a plurality of word alternatives for each of the spoken words, each of the plurality of word alternatives being identified by comparing a portion of the electronic recording with a lexicon, each of the plurality of word alternatives being assigned a probability of correctly identifying a spoken word; (C) loading the word alternatives and the probabilities to electronic file storage; and (D) examining the word alternatives and the probabilities to determine at least one characteristic of the plurality of spoken words. The at least one characteristic may include a frequency with which a word alternative occurs within the plurality of spoken words, and/or the presence of a pattern comprising a defined sequence of word alternatives.

In accordance with another embodiment, a computer-readable medium having instructions recorded thereon is provided, which instructions, when executed by a computer, perform a method for analyzing verbal communication. The method comprises acts of: (A) producing an electronic recording of a plurality of spoken words; (B) processing the electronic recording to identify a plurality of word alternatives for each of the spoken words, each of the plurality of word alternatives being identified by comparing a portion of the electronic recording with a lexicon, each of the plurality of word alternatives being assigned a probability of correctly identifying a spoken word; (C) loading the word alternatives and the probabilities to electronic file storage; and (D) examining the word alternatives and the probabilities to determine at least one characteristic of the plurality of spoken words.

BRIEF DESCRIPTION OF THE DRAWINGS

FIG. 8 depicts an exemplary GUI which may display a portion of voice communication data which matches a pattern in accordance with one embodiment of the invention.

DETAILED DESCRIPTION

The technical challenges associated with conventional speech recognition techniques may be mitigated by more fully utilizing the information produced during conventional recognition processes. In particular, while conventional speech recognition tools determine a set of alternatives for each spoken word, and determine which of the alternatives has the highest probability of actually being the word spoken, thereby identifying a single "best" match for a spoken word or phrase, these tools then discard the remainder of the alternatives. These alternatives, and corresponding statistical data generated therewith, can have significant value in determining the content of a body of voice data.

Accordingly, one embodiment of the present invention provides a method for collecting and analyzing voice data, wherein a sample of spoken words is collected and converted to electronic form, a plurality of alternatives for each word in the voice data is identified, the probability that each alternative represents the word spoken is determined, at least a portion of the alternatives and corresponding probabilities are loaded to electronic file storage, and analysis is performed on the portion of alternatives and probabilities to determine the content of the voice data. Thus, rather than attempting to definitively identify each word or phrase that was spoken, one aspect of the present invention is directed to identifying the words that might have been spoken, so that the words that were actually spoken may be statistically amplified across a sample of voice data.

Analysis of the data collected in this fashion may reveal characteristics that may not have been identifiable using conventional speech recognition techniques. For example, the frequency with which alternatives appear in the data within a specific time period may be determined, meaning that words or phrases most frequently spoken in that period may be approximated (i.e., based on the alternatives) without requiring previous knowledge of the data's content. In addition, the data may be matched against one or more "patterns," or configurable data constructs prepared by a user to represent various ways of communicating a concept, to determine the occurrence of that concept in the data. Data from one time period may be compared with data collected in other time periods in order to identify trends, and/or compared with the occurrence of specific events to determine the correlation between conversational topics and those events. In addition, data may be segmented according to its content to achieve any of numerous objectives. Several forms of data analysis which may be performed are disclosed in detail below.

Figure 1:
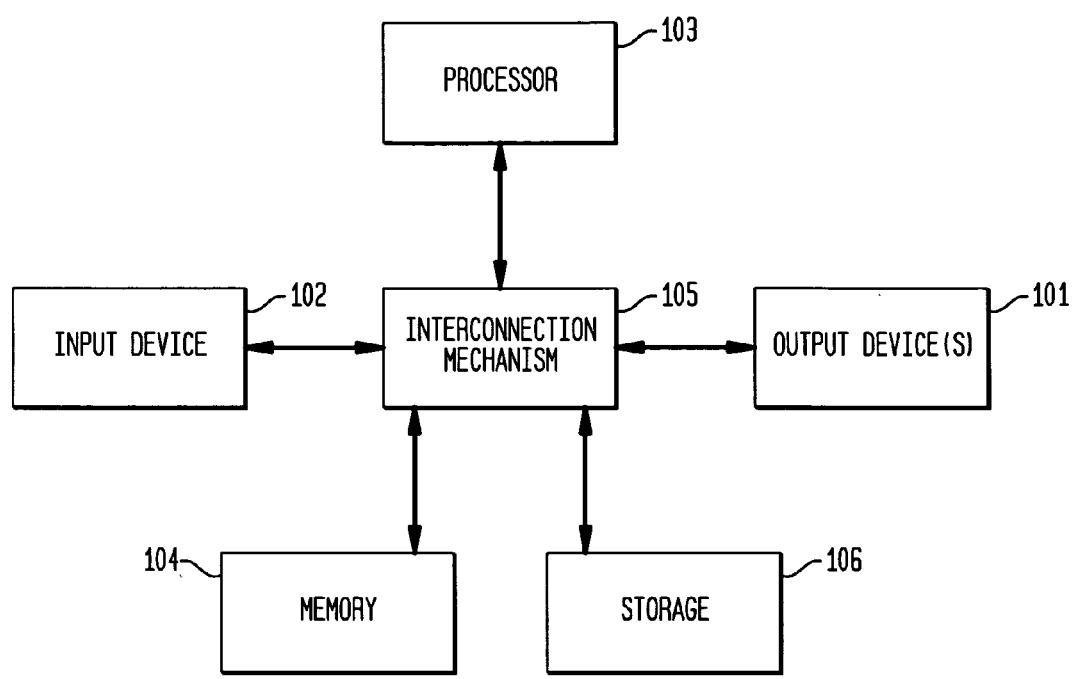
FIG. 1 is a block diagram of a computer system on which embodiments of the invention may be implemented.

Various aspects of the invention may be implemented on one or more computer systems, such as the exemplary computer system 100 shown in FIG. 1. Computer system 100 includes input devices 102, output devices 101, processor 103, memory system 104 and storage 106, all of which are coupled, directly or indirectly, via interconnection mechanism 105, which may comprise a bus or switch. The input devices 102 receive input from a user or machine (e.g., a human operator, or telephone receiver), and the output devices 101 display or transmit information to a user or machine (e.g., a liquid crystal display).

The processor 103 executes a program called an operating system which controls the execution of other computer programs, and provides scheduling, input/output and other device control, accounting, compilation, storage assignment, data management, memory management, communication and data flow control. The processor and operating system define the computer platform for which application programs in other computer programming languages are written.

The processor 103 may also execute one or more programs to implement various functions, such as those which embody aspects of the invention. These programs may be written in a computer programming language such as a procedural programming language, object-oriented programming language, macro language, or combination thereof.

Figure 2:
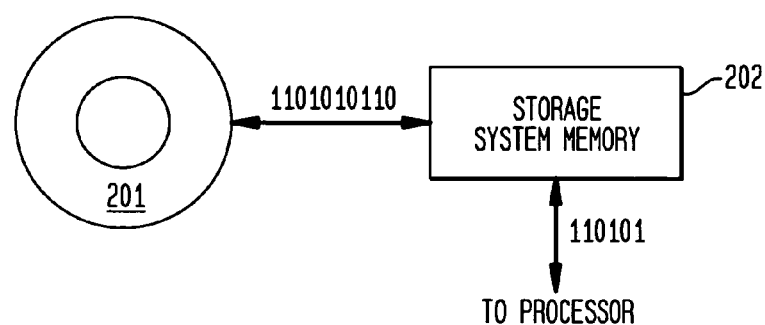
FIG. 2 is a block diagram of a data storage system on which embodiments of the invention may be implemented.

These programs may be stored in storage system 106. The storage system may hold information on a volatile or non-volatile medium, and may be fixed or removable. The storage system is shown in greater detail in FIG. 2. It typically includes a computer-readable and writeable nonvolatile recording medium 201, on which signals are stored that define the program, or information to be used by the program. The medium may, for example, be a disk or flash memory. Typically, in operation, the processor 103 causes data to be read from the nonvolatile recording medium 201 into a volatile memory 202 (e.g., a random access memory, or RAM) that allows for faster access to the information by the processor 103 than does the medium 201. This memory 202 may be located in storage system 106, as shown in FIG. 2, or in memory system 104, as shown in FIG. 1. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is also not limited to a particular memory system 104 or storage system 106.

Figure 3:
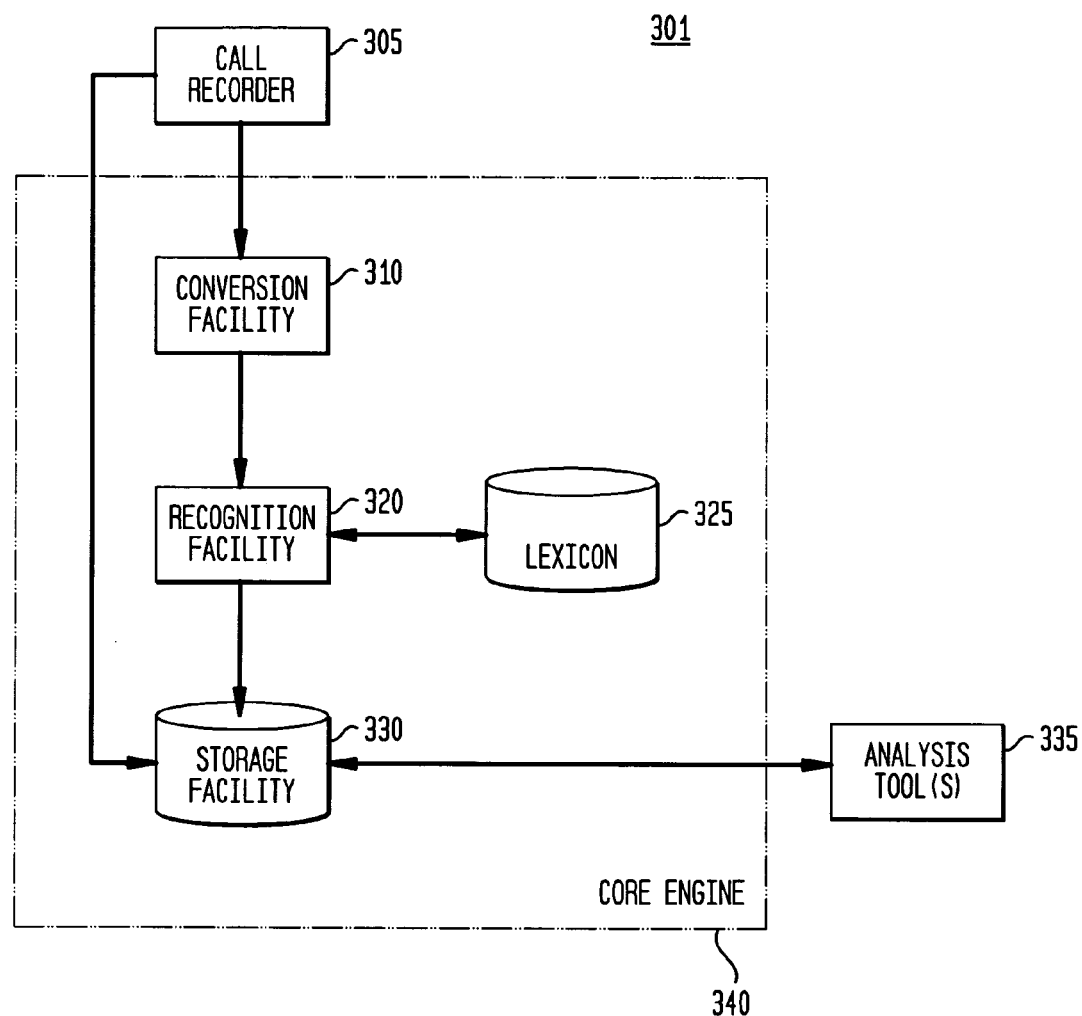
FIG. 3 is a block diagram of a system for processing voice communication data in accordance with one embodiment of the invention.

The exemplary system 301, shown in FIG. 3, may be implemented wholly or in part on computer system 100. The system 301 facilitates the collection, storage and analysis of voice data. System 301 includes call recorder 305, which may be any suitable device used to record conversations, such as a device which is conventionally employed in a "call center" in which customer service and/or telemarketing functions are performed. In one embodiment, the call recorder 305 records the conversation, time, length, originating number and recipient associated with each call. The data comprising the conversation may be stored in any suitable sound file format, such as WAV, AVI, or other format, or any combination thereof.

In the embodiment shown, the call recorder 305 transmits portions of call data to components within core engine 340. Specifically, call recorder 305 transmits a first portion of the data comprising the recorded conversations (i.e., the sound files) to conversion facility 310, and a second portion of the data describing the conversation, such as the time, length, originating number and recipient, to storage facility 330. This transmission to core engine 340 may occur at any suitable frequency, and using any suitable communications infrastructure.

In one embodiment, conversion facility 310 is configured to convert the sound file(s) which comprise the conversation data to the format(s) expected by recognition facility 320. For example, if recognition facility 320 is configured to process AVI sound files, then conversion facility 310 converts conversation data to this format. Some sound files may be provided in a format which serves as a "container" for one or more other formats. For example, sound files provided in WAV format may serve as a container for multiple underlying sound files, which may each potentially exist in different formats. Accordingly, in one embodiment, conversion facility 310 is configured to convert each of the individual files held by a container to the format(s) expected by recognition facility 320. Skilled artisans will appreciate that this may be accomplished in any of numerous ways, and the invention is not limited to a particular implementation.

Recognition facility 320 is configured to identify the alternatives and corresponding probabilities for the words contained in the conversation data. In one embodiment, recognition facility 320 comprises an "off-the-shelf" speech recognition tool configured for this purpose. In the embodiment shown, recognition facility 320 employs lexicon 325 to determine the alternatives and probabilities, which may be provided with an off-the-shelf tool or constructed to achieve a specific objective. As discussed in the foregoing, the lexicon 325 is a collection of pre-programmed words which are recognizable to the recognition facility 320. The recognition facility may produce output which includes alphanumeric data representing the identified alternatives, probabilities, and other statistics. The processing performed by recognition facility 320 is described in much greater detail below with reference to FIG. 4.

Recognition facility 320 transmits its output to storage facility 330. In one embodiment, storage facility 330 is configured to organize this information, as well as information received from call recorder 305, and load it to an electronic file storage, such as a database. While any suitable form of electronic file storage may be employed to store data produced by call recorder 305 and recognition facility 320, it may be advantageous, particularly in settings wherein large amounts of data are collected, to employ a scalable database system, such as a relational or object-oriented database system.

Figure 9:
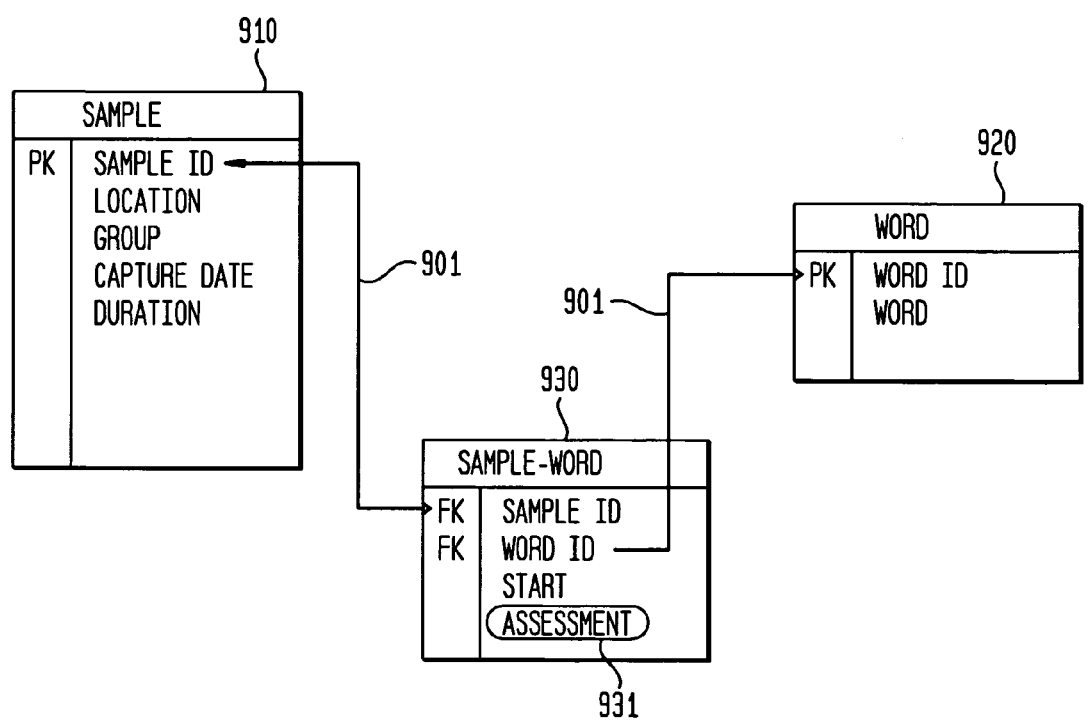
FIG. 9 is a block diagram depicting an exemplary data structure used by some embodiments of the invention.

A simplified version of a data structure, which is used with a relational database management system (RDBMS) to support one or more of the functions discussed herein, is depicted in FIG. 9. As is common with a relational database, FIG. 9 depicts a number of tables, each of which contains a number of columns. The data structure of FIG. 9 includes sample table 910, word table 920, and sample-word table 930. At a high level, the sample table 910 stores information related to distinct samples of speech data, such as portions of telephone calls. The word table 920 stores the words which are recognizable to the system, such as a version (e.g., a copy) of the lexicon 325 (FIG. 3). The sample-word table 930 stores relationships between portions of speech data described in the sample table 910 and the words stored in the word table 920. In this manner, each row in the sample-word table identifies an alternative for a portion of speech data described in the sample table 910. The sample-word table 930 also includes a column in which an assessment 931 of each alternative (e.g., a probability that the alternative matches the word in the word table 920) is stored.

The sample table 910 and word table 920 includes a column which is designated as a primary key ("PK"), meaning that the column stores a unique value in each row of its respective table. In addition, the sample-word table 930 contains columns which are designated as foreign keys ("FK"), meaning that the columns have a logical association with a column in another table. This logical association is indicated by the arrows 901 shown in FIG. 9. A logical association may be established for any of numerous reasons, such as to maintain relational integrity between the tables. For example, the sample-word table 910 has a column which stores a sample ID for each row in the table. This sample ID has a foreign key to the sample ID in the sample table 910, such that that the sample-word table 930 can never store a sample ID that is not also stored in the sample table 910. In this manner, consistency is maintained between columns in various tables.

It should be appreciated that the data structure of FIG. 9 is merely exemplary of an electronic file storage which may be employed. The invention is not limited to any particular implementation, and any of numerous data structures may alternatively be employed. A suitable data structure may include different tables, or no tables at all, if the data structure is not a relational database.

Referring again to FIG. 3, in the embodiment shown, storage facility 330 is accessible to analysis tool(s) 335, which may be employed to perform any of numerous forms of analysis stored in storage facility 330. Analysis tool(s) 335 may include any of numerous user interfaces configurable to access data stored in the format chosen for storage facility 330. For example, if storage facility 330 comprises an relational database, analysis tool(s) 335 may comprise a user interface configured to issue Structured Query Language (SQL) query commands. A portion of the analysis which may be performed using analysis tool(s) 335 is described in greater detail below with reference to FIGS. 5 and 6.

Figure 4:
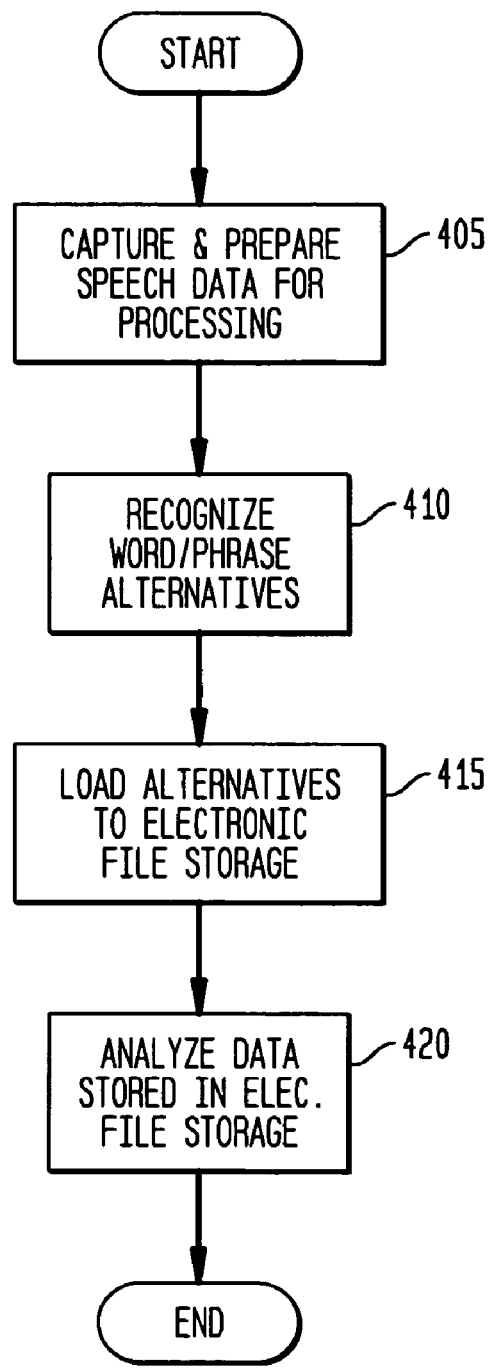
FIG. 4 is a flowchart depicting a process for processing voice communication data in accordance with one embodiment of the invention.

FIG. 4 depicts a process, which may be performed by the system of FIG. 3, to capture, catalog and analyze voice data in accordance with one embodiment of the present invention. Upon the start of the process of FIG. 4, voice data is captured and prepared for processing in act 405. As discussed above, this data may be captured by a conventional call recorder, such as call recorder 305, in an electronic form (i.e., as one or more sound files). To prepare the data for processing, the file(s) may be converted to an electronic format which is expected by a speech recognition tool such as recognition facility 320.

Upon the completion of act 405, the process proceeds to act 410, wherein the data is processed to identify alternatives for words and/or phrases in the data. As discussed above, in one embodiment this processing is performed by an "off-the-shelf" speech recognition tool configured for this purpose. However, the invention is not limited to an off-the-shelf tool, as the tool may be arranged and implemented in any suitable manner, such as with a tool constructed for this purpose, or with a tool which combines conventional and customized components.

As discussed above, many conventional speech recognition tools seek to identify a word or phrase by matching it to one or more entries provided in a lexicon. For a given word or phrase, a number of alternatives may be identified, along with a probability that each alternative represents the actual word or phrase spoken. The probability assigned to each word or phrase may depend at least in part on surrounding words, such that words more commonly joined in a sentence are deemed to be more probably correct than other alternatives. For example, a phrase may be deemed more likely to be "take me to the ballgame" than "take me tooth a ballgame," and this phrase may be assigned a higher probability of being correct as a result. Nonetheless, both of these collections of words are identified as possible alternatives for the spoken word or phrase, and are retained for further analysis. Given that multiple alternatives are generated for each word or phrase, a large amount of data may be produced during the recognition process, particularly where a large body of voice data (e.g., a sample of telemarketing or customer service calls) is collected.

In one embodiment, the number of alternatives produced by a tool for each spoken word or phrase by the tool is modifiable. For example, a tool may be configurable to provide only the alternatives which meet or exceed a threshold probability of matching the word(s) spoken, such as alternatives which have at least a 10% probability of matching the word(s) spoken. Configuration may be accomplished in any suitable manner, such as with input provided by a user via a graphical user interface. Such configuration may expedite subsequent processing, by minimizing the amount of alternatives to only those which meet minimum standards.

In one embodiment, a tool may comprise a modifiable lexicon. For example, the tool may be provided with means (e.g., a software development kit, or SDK) through which words in the lexicon may be added, deleted or modified, in automated or semi-automated fashion. In one example, an SDK may be used to provide access to the lexicon by an automated routine which, when executed, customizes the lexicon to include material specific to a particular context. For instance, the lexicon may be modified to suit a specific business's needs by incorporating material from the business's training manuals, help desk manuals, knowledge bases and/or web site(s). The automated routine may include procedures which incorporate and aggregate words in the materials, and include at least a portion of them in the lexicon. In addition, the routine may be configured to include only a portion of the material, such as the words most commonly found in the materials.

Similarly, an automated or semi-automated routine may be provided to remove words from a lexicon, such as words which are not often used in a particular context. Again, the removal of words may cause less alternatives to be generated by the speech recognition tool for each word or phrase, thereby potentially expediting subsequent processing as discussed above.

Upon the completion of act 410, the process proceeds to act 415, wherein the alternatives and corresponding probabilities are loaded to electronic file storage. In one embodiment, the data provided by the speech recognition tool is loaded to a database, such as a relational or object-oriented database. Loading the data to electronic file storage may be performed in any suitable manner, such as by executing loader scripts, creating a "flat" file which comprises the data collected, or using any other suitable technique. The data may be organized in any suitable fashion, as the invention is not limited to a particular implementation. For example, the data may be organized such that alternatives are ordered according to corresponding probability, time of capture, any other criteria, a combination thereof, or no criteria at all.

Upon the completion of act 415, the process proceeds to act 420, wherein the data in electronic file storage is analyzed. Because the data resides in electronic file storage (e.g., a database), analysis may be performed at any time which is convenient. Unlike conventional speech recognition tools, which load a small number of alternatives and corresponding probabilities to volatile, temporary storage while attempting to definitively identify a spoken word or phrase, and then discard that information, the present invention loads the information to permanent storage (e.g., a database) so that the information can be examined "after the fact." As a result, a larger volume of data (e.g., a larger number of telephone calls) may be examined, and deeper analysis may be performed.

Analysis may take any of numerous forms. In one embodiment, analysis may be performed with the aid of one or more graphical user interfaces (GUIs), which may be configured to allow a human user to issue commands to query the data in electronic file storage. However, analysis need not involve human intervention, or the use of a GUI, as automated routines may also be executed to perform data analysis.

Analysis may be performed on a body of data to determine the occurrence and/or frequency of alternatives therein. In this manner, the content of a body of voice data may be determined, without previous knowledge of the words or phrases in the data. This may have any of numerous uses. For example, a business may analyze a body of telephone calls received by its customer service department to find one or more unexpected alternatives in those calls, which, upon further investigation, indicates that customers have found an unforeseen use for the business's product. This discovery may influence the way the business markets the product. In another example, an unexpected alternative found in a body of calls may indicate the use of an undesirable word or concept by a business's telemarketing representatives, thereby identifying a training opportunity.

Figure 5:
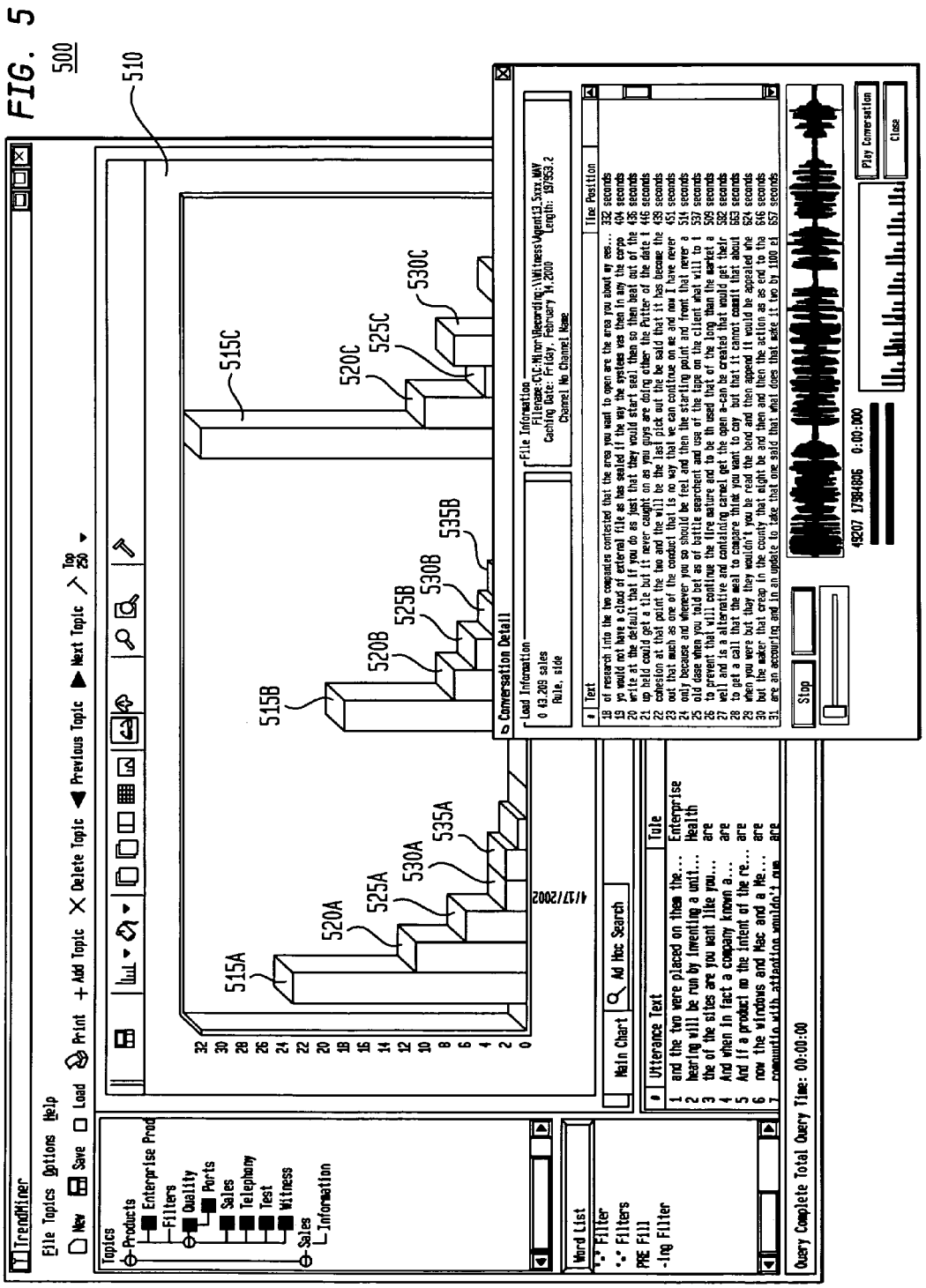
FIG. 5 depicts an exemplary graphical user interface (GUI) which may be used to determine the content of voice communication data in accordance with one embodiment of the invention.

FIG. 5 depicts an exemplary graphical interface (GUI) which displays information related to the occurrence of word alternatives in a body of voice data. More particularly, the interface of FIG. 5 displays a bar chart, in which individual bars represent the occurrence of a specific word alternative in a time period. Thus, using the interface of FIG. 5, a user may compare the prevalence of one word alternative with that of others during multiple periods, thereby more easily identifying trends.

FIG. 5 shows interface 500, which complies with the Microsoft Windows standard well-known in the art. Interface 500 includes portion 510. The bar chart in portion 510 displays information representing the occurrence of six word alternatives during three separate time periods, although the invention is not limited in this regard, as any suitable number of alternatives and/or time periods may be displayed. In addition, any suitable time period may be defined for comparison, including minutes, hours, days, and/or other periods.

In portion 510, the frequency of a specific alternative in the first time period (i.e., Apr. 17, 2002) is represented by bar 515A, the frequency of the alternative in the second time period is represented by bar 515B, and the frequency of the alternative in the third time period is represented by bar 515C. Similarly, bars 520A-C, 525A-C, 530A-C, and 535A-C represent the frequency of other word alternatives within each of the three time periods. Thus, using interface 500, a user may identify relationships between the occurrence of one word alternative and another during a time period. For example, a user may discover that a frequent occurrence of a first product name during a period is correlated to a frequent occurrence of a second product name.

In addition to determining the frequency with which individual words occur in a body of data, the presence of particular concepts may be determined by matching the data to one or more "patterns" which represent various ways of communicating those concepts. A pattern may be a data construct embodying one or more word alternatives, which represents one way of communicating the concept. For example, to determine whether a sample of data contains an offer of a rental car to a customer, patterns may be constructed which provide the phrases, "May I offer you a rental car?" and "Would you like a car with that?".

Patterns may be constructed manually, in semi-automated fashion, in automated fashion, or a combination thereof. Any suitable number of patterns may be constructed, and each pattern may contain any suitable combination and quantity of words or phrases.

Figure 6:
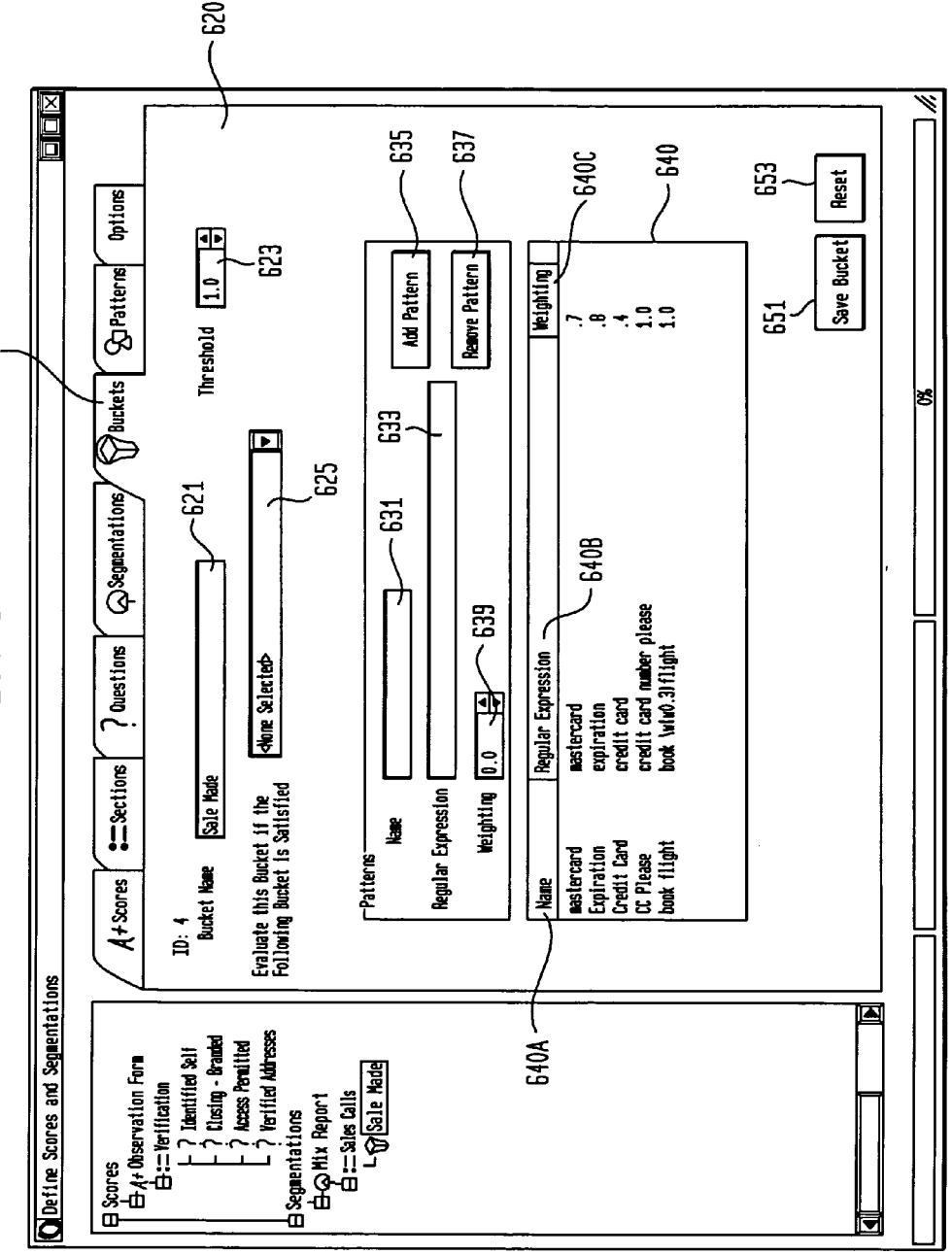
FIG. 6 depicts an exemplary GUI which may be used to define a pattern and/or segment for matching to a portion of voice communication data in accordance with one embodiment of the invention.

FIG. 6 depicts an exemplary GUI which may be employed to construct a pattern, and to define one or more "buckets" to which a segment of the data may be assigned based on a match with one or more of the patterns. As with the interface depicted in FIG. 5, interface 600 complies with the Microsoft Windows standard. Interface 600 includes portion

620, which a user may access by selecting tab 615 according to the well-known tab metaphor convention.

Box 640 displays a collection of existing patterns. By providing input to boxes 631, 633 and 639, a user may add a new pattern, or remove an existing one, from the patterns shown in box 640. To create a new pattern, a user may specify a name in box 631, and specify an expression (i.e., a specific sequence including one or more words) to define the pattern in box 633. Using box 639, a user may specify a "weighting" for a pattern, which, in the embodiment shown, is used to determine whether a match to a pattern means that a data segment is assigned to a bucket, as described in greater detail below.

When a user wishes to create a pattern based on input provided in boxes 631, 633 and 639, the user clicks button 635 to add the pattern to the collection shown in box 640. When a user wishes to remove a pattern from the collection shown in box 640, the user selects a pattern with a mouse click, and clicks box 637 to remove the pattern from box 640.

Box 640 is divided into columns 640A-C, which contain data provided in boxes 631, 633 and 639, respectively. For each pattern, the expression shown in box 640B comprises a sequence of words which is matched against the data to determine whether the data contains that pattern. For example, the pattern having a name of "CC Please" is expressed as the sequence "credit card number please." When a segment of data includes those four words in sequence, the data matches the pattern.

Patterns may be expressed in such a manner as to allow for word sequence variability. For example, the pattern having a name of "book flight" is expressed as "book \w{0.3} flight." In the embodiment shown, when a segment of data contains the words "book" and "flight" separated by between zero and three words, the expression is satisfied, and the data matches the pattern. It should be appreciated that this exemplary expression represents only one form of conveying a pattern of words, as any suitable manner of articulating logical expressions to define a variable pattern of words may be employed.

Box 621 allows a user to specify a name for a bucket, and box 623 allows a user to specify a threshold weighting for the bucket. In the embodiment shown, a segment of data is assigned to a bucket based on the presence and aggregate weighting of one or more patterns shown in box 640. For example, in the embodiment shown, for a segment of data to be assigned to the "Sale Made" bucket having a threshold weighting of 1.0, the segment must match one or more patterns whose aggregate weighting meets or exceeds 1.0. Thus, if a segment of data matched only the "Mastercard" pattern, which has a weighting of 0.7, shown in box 640, the segment would not be assigned to the "Sale Made" bucket. However, if a data segment matched both the "Mastercard" and "Credit Card" patterns, which have an aggregate weighting of 1.1, the data segment would be assigned to the "Sale Made" bucket.

Drop down box 625 allows a data segment to be considered for assignment to a bucket only if a prerequisite is met. More particularly, the data segment is considered for assignment to the bucket only if the data segment is assigned to another bucket. It should be appreciated that any suitable prerequisite, or combination of prerequisites, for consideration may be supplied. For example, in another embodiment, a data segment may be considered for assignment to a bucket if assigned to another bucket with a minimum threshold score.

Box 651 allows a user to store in permanent memory the pattern selections associated with a particular bucket, and button 653 allows a user to restore settings for a particular bucket to those which existed before the user's manipulation of the selections allowed by interface portions 620.

Figure 7:
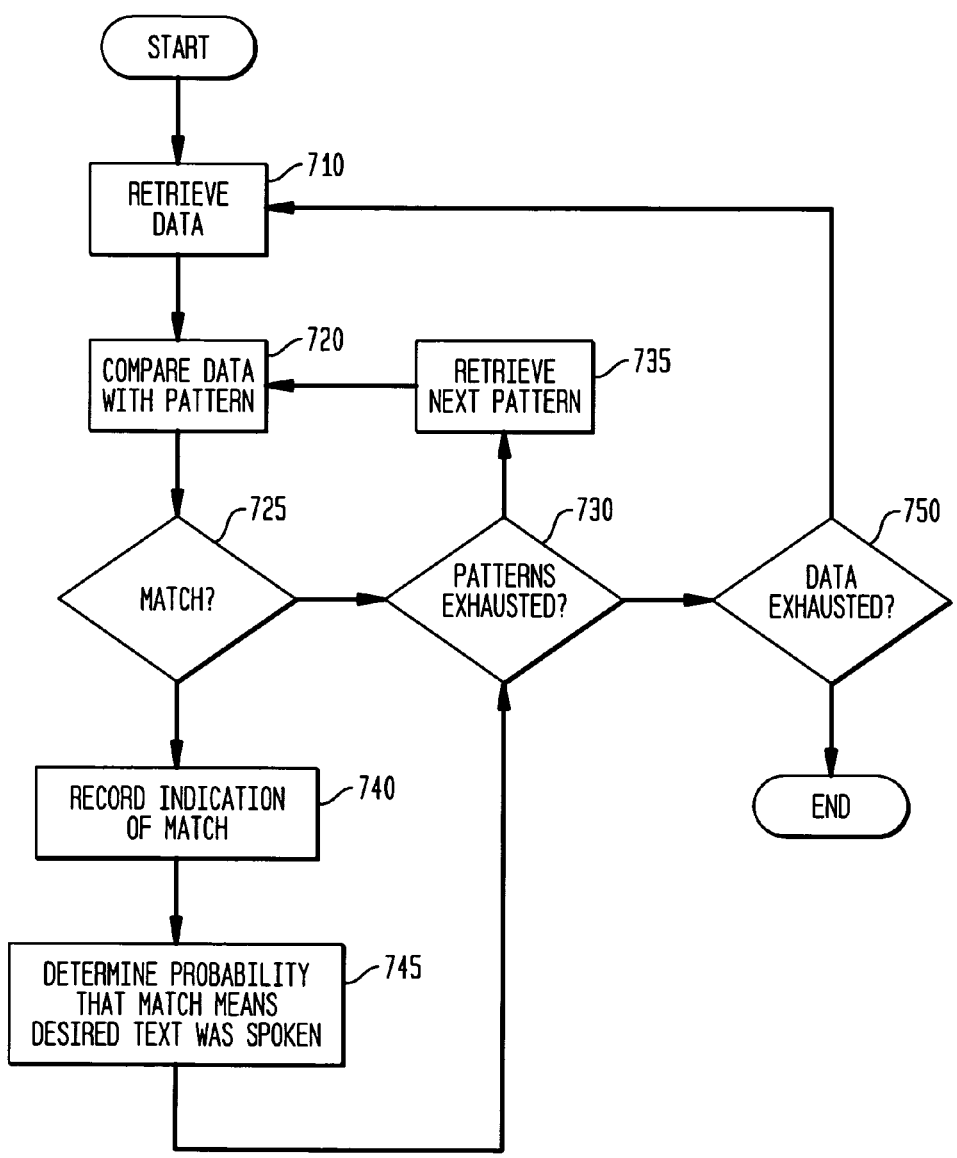
FIG. 7 is a flowchart depicting a process for determining whether a portion of voice communication data matches a pattern in accordance with one embodiment of the invention.

The process depicted in FIG. 7 may be performed to determine whether a body of voice data contains the specified patterns. Upon the start of the process, act 710 commences, wherein data which is to be compared with the pattern(s) is retrieved from electronic file storage. In one embodiment, alternatives identified for each word or phrase in the data are retrieved. Retrieval may be accomplished in any of numerous ways, such as by extracting the alternatives from a database. Any suitable access method may be employed, such the execution of a database query, to retrieve the appropriate data from storage.

Upon the completion of act 710, the process proceeds to act 720, wherein the alternatives are compared with the first of a plurality of patterns. The pattern used for comparison may be selected in any suitable manner, including arbitrarily. The comparison between the alternatives and the pattern may also be performed in any suitable manner, such as with a strict comparison between the alternatives and the words included in the pattern, with a comparison aided at least in part by fuzzy logic, or using another technique.

Upon the completion of act 720, the process proceeds to act 725, wherein a determination is made as to whether a match exists between the data and the pattern. This may be accomplished in any of numerous ways. For example, a determination may be made that a match exists if any of the alternatives in the data matches the pattern, if at least one alternative having a minimum probability of representing the actual words spoken matches the pattern, or using another technique.

If it is determined in act 725 that a match does not exist, the process proceeds to act 730, wherein a determination is made as to whether the plurality of patterns are exhausted (i.e., whether other patterns exist with which the alternatives have not been compared). If it is determined in act 730 that the patterns are exhausted, the process proceeds to act 750, wherein a determination is made as to whether the data is exhausted (i.e., whether other data exists with which the patterns have not been compared). If it is determined in act 750 that the data is not exhausted, the process proceeds to act 710, wherein a next segment of data is retrieved from electronic file storage, and the next segment of data is compared with a pattern as described above. If it is determined in act 750 that the data is exhausted, the process ends.

If it is determined in act 730 that the patterns are not exhausted, the process proceeds to act 735, wherein the next pattern in the collection produced in act 705 is retrieved from electronic file storage. Upon the completion of act 735, the process returns to act 720, wherein the data is matched with the retrieved pattern as described above.

If it is determined in act 725 that a match exists, the process proceeds to act 740, wherein an indication of a match is stored in electronic file storage. This may be accomplished in any suitable manner, such as by storing the indication in the electronic file storage depicted in FIG. 3.

Upon the completion of act 740, the process proceeds to act 745, wherein a probability is determined that the match between the alternatives and the pattern indicates that the desired concept was communicated. In one embodiment, each pattern may be assigned a probability that it represents the desired concept being communicated. Returning to the rental car offer example, a pattern which includes the question "May I offer you a rental car?" may be assigned a higher probability of representing the concept embodied by the rental car offer than a pattern containing the question "Would you like a car?".

Upon the completion of act 745, the process proceeds to act 730, wherein a determination is made as to whether the patterns are exhausted, as described above. In this manner, the process repeats until all the considered patterns and data have been compared.

Data analysis in this manner may take any of numerous forms. Obviously, one form may be to determine the rate at which a specific concept was communicated in a body of telephone calls. By determining the presence of a pattern in the calls, and assigning each of those patterns a probability of matching the desired concept, an estimation of the frequency with which the concept was communicated in the calls may be determined. Thus, a business may determine, for example, how frequently a rental car was offered by its telemarketing representatives. In addition, the business may determine how frequently each representative made the offer, providing an opportunity to evaluate the representative's performance.

An exemplary manifestation of this type of analysis is shown in FIG. 8. FIG. 8 includes report interface 801, which is generated to display the rate at which segments of data meet specific patterns. Report interface 801 includes entries 805 and 810, which display the rate at which specific data segments (e.g., telephone calls) are assigned to buckets, such as buckets that may be constructed or modified with the interface 600 (FIG. 6).

Entry 805 displays a percentage of data segments which are assigned to the bucket "Sale Made," specified in box 621 (FIG. 6), and those in which a sale was not made. The data segments categorized as "sale not made" may represent data segments which did not match the "Sale Made" bucket (i.e., not matching criteria set forth in interface 600), or may represent data segments which match another bucket not shown in interface 600. Similarly, entry 810 shows data segments which are assigned to "E-TKT Accepted," "E-TKT Declined," and "E-TKT Not Offered" buckets. Thus, a user may determine the percentage of data segments which meet one or more criteria. Any suitable number and combination of criteria may be provided.

Another form of data analysis may include determining a portion of data which is suitable for closer evaluation. For example, in many call centers, supervisors listen to calls after they occur to get a sense for the tone of ongoing communication with customers. However, many call centers employ a relatively small number of supervisors given the call volume the center supports, so pre-selecting a subset of worthwhile calls for supervisor scrutiny may be of great value. By determining which of the calls match the pattern (s) having the highest probability of representing a specific concept, calls which may be suitable for a supervisor's scrutiny can be determined. Alternatively, by determining which of the calls do not match any pattern, the calls which are definitely not suitable for a supervisor's scrutiny may also be identified.

Yet another form of data analysis may include discerning relationships between buckets. Many customer service call centers seek to identify the particular issues that caused customers to contact them, so that the business may resolve those issues over time. If a large percentage of calls, for example, are directed to a product component provided by a particular supplier, it may be useful to know that a large percentage of these calls also relate to the purchase of the product from a particular retailer. By studying relationships between seemingly disparate characteristics, a business may be able to resolve issues more quickly.

Yet another form of data analysis may include the calibration of call evaluation. Many call centers evaluate representatives by listening to their conversations with customers, in order to provide feedback on their tone and the way in which they provided information to the customer. Often, a score is assigned to a representative for the call based on this evaluation. Scores achieved by the representative over time are often used to determine the representative's compensation. However, different supervisors may score a given call differently, meaning that representatives' performances may be inconsistently evaluated. Generally speaking, it is known that more experienced supervisors tend to issue very similar scores for a given call, meaning that disparities are often due to a lack of supervisor training. By tracking experienced supervisors' scoring of calls over time, and correlating the presence of particular patterns in the calls to particular scores, a training tool may be created for less experienced supervisors. By comparing the scores the less experienced supervisors issue with the scores based on the presence of patterns, a call center may calibrate call evaluation over time.

The above-described embodiments of the present invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. In this respect, it should be appreciated that the above-discussed functions of the agent can be distributed among multiple processes and/or systems. It should further be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A method for analyzing verbal communication, the method comprising acts of:
   (A) producing an electronic recording of a plurality of spoken words;
   (B) processing the electronic recording to identify a plurality of word alternatives for each of the spoken words, each of the plurality of word alternatives being identified by comparing a portion of the electronic recording with a lexicon, each of the plurality of word alternatives being assigned a probability of correctly identifying a spoken word;
   (C) loading the word alternatives and the probabilities to a database for subsequent analysis; and
   (D) examining the word alternatives and the probabilities to determine at least one characteristic of the plurality of spoken words;
   wherein the at least one characteristic includes a frequency with which a first word alternative occurs within the plurality of spoken words; and
   wherein the at least one characteristic further includes a frequency with which a second word alternative occurs within the plurality of spoken words, and a comparison of the frequencies of the first word alternative and the second word alternative.

2. The method of claim 1, wherein the at least one characteristic further includes a comparison of the frequencies of the first word alternative and the second word alternative in a plurality of time periods.

3. The method of claim 1, wherein the at least one characteristic includes a presence of a pattern, the pattern comprising a defined sequence of word alternatives.

4. The method of claim 3, wherein the pattern is defined by a human user.

5. The method of claim 4, wherein the pattern is defined using a graphical user interface.

6. The method of claim 1, further comprising an act, performed before the act (B), comprising modifying the lexicon.

7. The method of claim 1, wherein the act (C) further comprises loading the word alternatives and the probabilities to a database.

8. A computer-readable medium having instructions recorded thereon, which instructions, when executed by a computer, perform a method for analyzing verbal communication, the method comprising acts of:
   (A) producing an electronic recording of a plurality of spoken words;
   (B) processing the electronic recording to identify a plurality of word alternatives for each of the spoken words, each of the plurality of words alternatives being identified by comparing a portion of the electronic recording with a lexicon, each of the plurality of word alternatives being assigned a probability of correctly identifying a spoken word;
   (C) loading the word alternatives and the probabilities to a database for subsequent analysis; and
   (D) examining the word alternatives and the probabilities to determine at least one characteristic of the plurality of spoken words.
   wherein the at least one characteristic includes a frequency with which a first word alternative occurs within the plurality of spoken words; and
   wherein the at least one characteristic further includes a frequency with which a second word alternative occurs within the plurality of spoken words, and a comparison of the frequencies of the first word alternative and the second word alternative.

9. The method of claim 8, wherein the at least one characteristic further includes a comparison of the frequencies of the first word alternative and the second word alternative in a plurality of time periods.

10. The method of claim 8, wherein the at least one characteristic includes a presence of a pattern, the pattern comprising a defined sequence of word alternatives.

11. The method of claim 8, wherein the pattern is defined by a human user.

12. The method of claim 11, wherein the pattern is defined using a graphical user interface.

13. The method of claim 8, further comprising an act, performed before the act (B), comprising modifying the lexicon.

14. The method of claim 8, wherein the act (C) further comprises loading the word alternatives and the probabilities to a database.

* * * * *